United States Patent [19]
Hollis, Jr.

[11] 3,794,356
[45] Feb. 26, 1974

[54] COUPLING DEVICE FOR USE WITH A BALL-TYPE HITCH

[76] Inventor: Russell E. Hollis, Jr., 502 Merrick Dr., Xenia, Ohio 45385

[22] Filed: Oct. 26, 1971

[21] Appl. No.: 192,504

[52] U.S. Cl............................. 280/513, 280/494
[51] Int. Cl............................................ B60d 1/06
[58] Field of Search... 280/511, 512, 513, 508, 433, 280/434, 494, 504; 292/302; 70/258

[56] References Cited
UNITED STATES PATENTS

| | | | |
|---|---|---|---|
| 3,492,024 | 1/1970 | Cooper | 280/512 |
| 2,925,286 | 2/1960 | Hodges, Jr. et al. | 280/434 |
| 3,163,445 | 12/1964 | Kirk et al. | 280/513 |
| 3,658,363 | 4/1972 | Marier et al. | 280/512 X |
| 2,848,253 | 8/1958 | Walker | 280/513 |

Primary Examiner—Kenneth H. Betts
Assistant Examiner—David M. Mitchell
Attorney, Agent, or Firm—Jerome P. Bloom

[57] ABSTRACT

A coupling device for use with a ball-type hitch having a body comprising a U-shaped, strap-like member with a rounded forward end and spaced legs extending rearwardly therefrom. A reinforcing member is affixed to the legs adjacent the rounded forward end of the body and forms with the rounded forward end a ball-receiving pocket. A thrust block for the hitch ball is located between the body legs and is spaced from the rounded forward end. The thrust block is shiftable between a position wherein it retains the hitch ball within the pocket and a position wherein it will release the hitch ball from the pocket. Means are provided to lock the thrust block in its ball-retaining position. The free ends of the legs of the U-shaped body may be affixed in any suitable manner to any conventional trailer or vehicle frame means.

19 Claims, 4 Drawing Figures

PATENTED FEB 26 1974 3,794,356
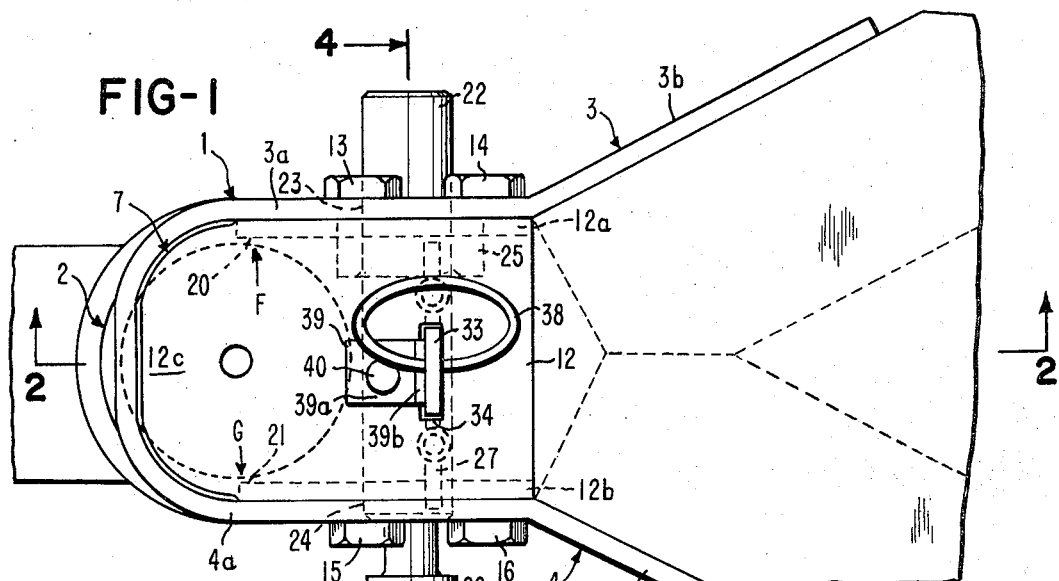
FIG-1
FIG-2
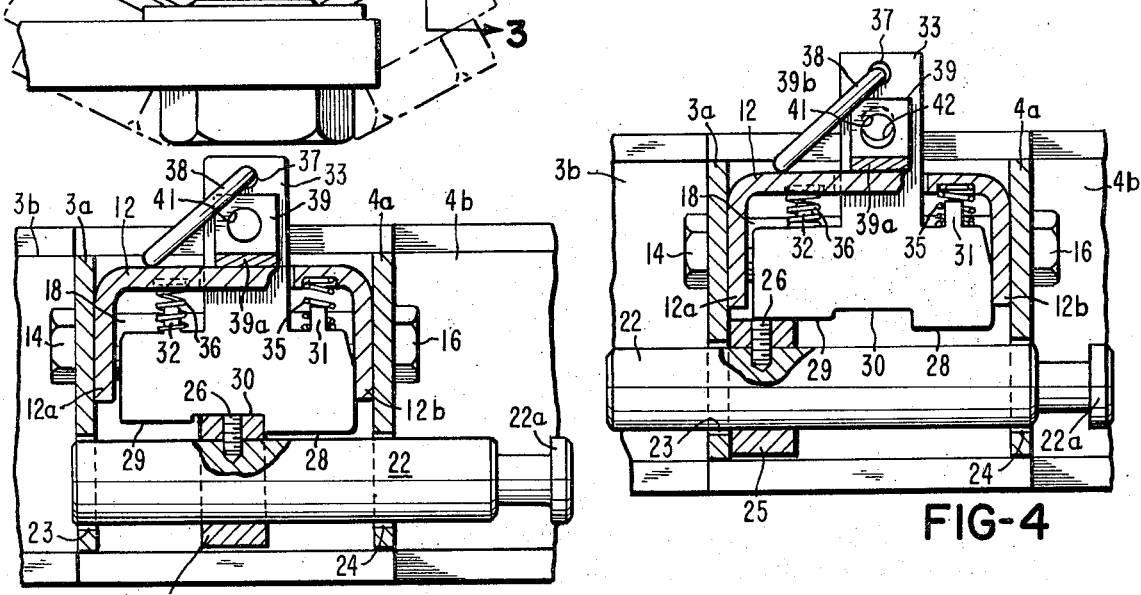
FIG-3
FIG-4

COUPLING DEVICE FOR USE WITH A BALL-TYPE HITCH

BACKGROUND OF THE INVENTION

1. Field of the Invention

The invention relates to a coupler for a vehicle to be pulled or trailed, and more particularly to a coupler to be used with a conventional ball-type hitch.

2. Description of the Prior Art

Prior art couplers have generally comprised a body of complex and irregular shape having a welded ball socket and some form of locking assembly. Soft, drawing quality steel has generally been used because the complex body configurations have required at least two severe forming operations. These operations, themselves, have required the use of heavy tonnage presses and expensive dies. The coupler bodies have generally been formed from irregularly shaped blanks, resulting in considerable scrap material. In addition, the severe forming steps have generally produced a number of defective parts, which had to be scrapped.

Prior art couplers have usually necessitated a number of welding operations during their assembly and have frequently required notching, cutting, rewelding or the like at the time of application to the frame of a vehicle.

The present invention is directed to a heavy duty coupler for use with mobile homes, heavy equipment, off-the-road industrial trailers and the like, and enables a light-weight unit useful for recreational vehicles, boat trailers, campers and similar structures.

With the exception of three stampings, all of the elements of the coupler of the present invention comprise standard, readily available parts. The stampings may be made of any suitable material, as for example hot rolled commercial quality steel. Stock sizes and lengths of material may be used, with no scrap formed other than punch outs. Only two parts (the body and the reinforcing member) require forming and they may be punched in the flat condition and then moderately formed through the use of low tonnage presses and inexpensive dies. Since the forming is moderate, heavier gauge material may be used. This is significant because mobile homes and the like are constantly increasing in size and weight with the result that couplers of greater strength are required.

The coupler of the present invention may be produced by simple mechanical assembly. There are no welds to fail so that it is characterized by increased safety.

The coupler of the present invention may be mounted on any vehicle frame and normally will require no notching, cutting rewelding or other modification at the time of mounting. It may be installed in any of the conventional ways including top mounting and under slung mounting, whereas conventionally, different models are required for different mountings.

As a consequence of the above, the device of the present invention provides a heavy duty, versatile coupler characterized by limited capital investment cost, low material costs, low labor and assembly costs and the ability to be applied to any vehicle frame and used with any conventional ball-type hitch.

SUMMARY OF THE INVENTION

The coupler of the present invention has a body comprising a U-shaped, strap-like member with a rounded forward end and spaced legs extending rearwardly therefrom. The rounded forward end of the body and the adjacent portions of the legs form a pocket to receive the ball of a conventional ball hitch. The rounded forward end has a depression therein providing a rearwardly facing ball seat on the inside surface thereof.

A channel-shaped reinforcing member is located between the body legs and is bolted, or otherwise affixed thereto. A forward portion of the reinforcing member forms an upper bearing surface for the ball-receiving pocket.

A shaft, spaced from the rounded end of the body, extends transversely of the body legs and is slidably mounted in coaxial perforations in the legs. That portion of the shaft, located between the legs, carrys a member of increased dimension which serves as a thrust block for the hitch ball, when the ball is located in the coupler pocket. The shaft and thrust block are shiftable between a ball-retaining position wherein the thrust block prevents removal of the ball from the pocket, and a ball-releasing position wherein the ball is free to be inserted in or removed from the coupler pocket.

Latch means are provided to engage the thrust block and maintain the thrust block and shaft in their ball-retaining position. The latch is biased to its thrust block-engaging position and additional means may be provided for locking the latch in its thrust block-engaging position.

Finally, the free ends of the legs of the coupler body are appropriately configured for attachment to any type of vehicle frame.

BRIEF DESCRIPTION OF THE DRAWINGS

FIG. 1 is a plan view of the coupler of the present invention illustrating the shaft and thrust block in their ball-releasing position.

FIG. 2 is a cross sectional view, taken along section line 2—2 of FIG. 1, but with the A-frame removed; the shaft and thrust block in their ball-retaining position; and a typical hitch ball shown in place in the coupler pocket.

FIG. 3 is a cross sectional view taken along the section line 3—3 of FIG. 2.

FIG. 4 is a cross sectional view taken along the section line 4—4 of FIG. 1.

DESCRIPTION OF THE PREFERRED EMBODIMENTS

As is most clearly shown in FIG. 1, the body of the coupler of the present invention (generally indicated at 1) comprises a U-shaped strap-like element. The body has a rounded forward end (generally indicated at 2) and spaced legs (generally indicated at 3 and 4) extending rearwardly of the forward end. The portions 3a and 4a of the legs 3 and 4, adjacent the rounded end 2, are substantially parallel. The free end portins 3b and 4b of the legs 3 and 4 are appropriately configured to be affixed to the frame means of a vehicle to be pulled or towed. As used herein, and in the claims, the term "vehicle" is intended to encompass any suitable means to be trailed, inclusive of mobile homes, recreational vehicles, boat trailers, heavy equipment, off-the-road industrial trailers, and the like. For purposes of an exemplary showing, a pair of beams are indicated at 5 and 6 comprising a conventional A-frame portion of a mobile home. The free ends 3b and 4b of the coupler body legs are bent outwardly to conform to the beams 5 and 6. It will be understood by one skilled in the art that the manner in which the legs ends 3b and 4b are affixed to the beams 5 and 6 does not constitute a limitation on the present invention. They may be affixed in any suitable manner inclusive of bolting, welding and the like. Furthermore, the beams 5 and 6 may have any suitable cross sectional configuration. Thus, they may be I beams, angle irons, channel members or the like.

It will be understood that since the leg ends 3b and 4b are simple strap-like members, they may be readily formed into any appropriate configuration for attachment to any type of frame means. Once appropriately formed, the leg ends 3b and 4b will generally not require any further cutting, notching or other modification and, in instances such as the one illustrated in FIG. 1, they will be substantially self-locating.

Referring both to FIGS. 1 and 2, the rounded end 2 of the coupler body and the adjacent portions of the legs 3 and 4 form a ball-receiving pocket, generally indicated at 7. For purposes of clarity, a ball 8 of a conventional ball hitch has been indicated in the pocket 7.

The inner surface of the forwardmost portion of the rounded end 2 is provided with a depression 9 forming a ball seat 10. The lowermost portion of the rounded end 2 is formed so as to provide a downwardly and outwardly flaring skirt 11. The skirt 11 serves two functions. First of all, it permits universal movement of the ball 8 in the pocket 7. This is indicated, for example, by the dashed line 8a showing the hitch ball in its forwardmost tilted position. Secondly, the skirt 11 aids in guiding the ball into the pocket 7 during the process of connecting the coupler and the ball hitch.

A reinforcing means 12 is located between the parallel portions 3a and 4a of the body legs. As is clearly discernible from FIGS. 3 and 4, the reinforcing means 12 has a channel-shaped cross sction including a planr web portion with downwardly depending legs 12a and 12b.

The reinforcing member 12 is held in place between the leg portion 3a and 4a by a pair of bolts 13 and 14. The bolts 13 and 14 pass through coaxial perforations in the leg portions 3a and 4a of the body and the downwardly depending legs 12a and 12b of the reinforcing member. The bolts 13 and 14 are provided with nuts 15 and 16 respectively. The bolts 13 and 14 carry spacer sleeves 17 and 18 respectively. The spacer sleeves 17 and 18 extend the full distance between the downwardly depending legs 12a and 12b of the reinforcing member. The spacer sleeves 17 and 18 enable the bolts 13 and 14 to clamp the reinforcing member 12 securely to the leg portions 3a and 4a of the body 1. In addition, the spacer sleeve 17 also serves as a bearing surface for the hitch ball 8, as will be described more fully hereinafter.

The web portion of the reinforcing member 12 has a forwardly projecting plate portion 12c which extends toward the rounded end 2 of the coupler body and fills the space defined thereby. This permits the reinforcing member to provide an upper bearing surface for the hitch ball 8, as at 19. It will further be noted that the forwardmost ends of the downwardly depending legs 12a and 12b extend into the coupler pocket providing lateral bearing surfaces for the hitch ball 8, as at 20 and 21. Thus, the coupler body 1 and the reinforcing member 12 provide a pocket for the hitch ball 8 which has a double thickness wall at the points 20 and 21.

Spaced rearwardly and downwardly of the ball seat 10, in a position below and generally between the bolts 13 and 14, there is a shaft 22 passing through coaxial perforations 23 and 24 in the portions 3a and 4a of the body legs. The perforations 23 and 24 and the diameter of the shaft 22 are so proportioned that the shaft is both rotatable and longitudinally shiftable within the perforations.

That portions of shaft 22 which lies between the portion 3a and 4a of the body legs has non-rotatively affixed thereto a thrust block 25. While the thrust block 25 may be an integral part of the shaft 22, it may also be a separate member (as shown) affixed to the shaft by any suitable means such as the pin 26.

The thrust block 25 serves as a bearing surface for the hitch ball 8, as will be described hereinafter. While the thrust block may have any suitable peripheral configuration, it is preferred that its periphery be provided with a plurality of bearing surfaces. Thus, when one of the bearing surfaces has become worn, a slight rotation of shaft 22 will bring a new bearing surface into position. For purposes of an exemplary showing, the thrust block 25 is illustrated as having an hexagonal periphery. It will also be noted that the thrust block 25 is so positioned and configured as to permit a rearward tilting of the hitch ball unit, as is indicated by the dotted line 8b.

When the thrust block 25 is located centrally between the leg portions 3a and 4a of the body 1, the distance between the forwardmost portion of the thrust block and the ball seat 10 is less than the diameter of the hitch ball. Thus, when the hitch ball 8 is seated in the pocket 7 and the thrust block is shifted to its central position between leg portions 3a and 4a, the thrust block will serve to prevent removal of the hitch ball from the pocket. Hereinafter, and in the claims, this central position of the thrust block will be referred to as its "ball-retaining position". The thrust block is illustrated in its ball-retaining position in FIGS. 2 and 3.

When the shaft 22 and thrust block 25 are shifted to a position wherein the thrust block lies adjacent the portion 3a of the leg 3 of the body, there will be clearance between the forwardmost portion of the thrust block and the hitch ball 8 and the hitch ball may be inserted into or removed from the pocket 7. Hereinafter, and in the claims, this position of the thrust block will be referred to as its "ball-releasing position". The thrust block is illustrated in its ball-releasing position in FIGS. 1 and 4.

The coupler of the present invention is provided with a latch means to maintain the shaft 22 and thrust block 25 in their ball-retaining position. Referring to FIG. 3, the latch means comprises a plate-like member generally indicated at 27. It will be understood that the latch may be a simple stamping, and no forming is required in its manufacture.

Along its bottom edge, the latch 27 has a pair of downwardly depending extensions 28 and 29. These extensions define a notch 30 therebetween. The upper edge of the latch has a pair of small, upwardly directed extensions 31 and 32 and an elongated, upwardly directed extension 33. The extension 33 comprises the latch handle and extends through a slot 34 in the reinforcing member 12.

As will be evident from FIGS. 2 and 3, the latch 27 is located between the bolts 13 and 14 and their respective spacers 17 and 18, and is so dimensioned as to be shiftable vertically. FIG. 3 illustrates the latch in its downwardmost, locking position wherein the thrust block 25 is located in the notch 30 and is thus locked in its ball-retaining position. The latch is biased to this position by a pair of compression springs 35 and 36. One end of each of the springs 35 and 36 abuts the upper edge of the latch 27. The other ends of these springs abut the inside surface of the reinforcing member 12. The springs are maintained in their positions by the latch extensions 31 and 32.

The latch 27 may be moved vertically upwardly to an unlocking position. This may be accomplished by applying a pulling force to the latch handle 33 against the action of springs 35 and 36. It is within the scope of the invention to provide the latch handle 33 with a perforation 37 to receive a ring 38, by which the pulling force may be more readily applied manually.

When the latch 27 is pulled to its unlocking position, the shaft 22 and thrust block 25 may be shifted to the position shown in FIG. 4. It will be noted that the downwardly depending extension 29 is slightly shorter than the downwardly depending extension 28, so hat the extension 29 may rest upon the thrust block when it is in its ball-releasing position. It will be evident from FIG. 4 that if the shaft 22 and thrust block 25 were to be shifted to the right, they would achieve their ball-retaining position as shown in FIG. 3 and the latch 27 would snap downwardly into its locking position under the influence of springs 35 and 36. To assist in shifting the shaft 22 and thrust block 25, it is within the scope of the invention to provide the shaft with a grasping means or handle portion, as shown at 22a.

Finally, the upper surface of the reinforcing member 12 may be provided wth an L-shaped member 39 positioned adjacent the slot 34. One leg 39a of the member 39 rests upon the upper surface of the reinforcing member 12 and may be affixed thereto in any suitable manner. For purposes of an exemplary showing, it is illustrated as attached by means of a rivet 40. The other leg 39b of the member 39 extends upwardly parallel to and adjacent the handle portion 33 of the latch 27.

The upstanding leg 39b has a perforation 41 therein. The handle portion 33 of the latch 27 has a similar perforation 42 therein. When he latch is in its lowermost or locking position, the perforations 41 and 42 will be coaxial, as is clearly shown in FIGS. 2 and 3. The perforations 41 and 42 may then accept the hasp of a conventional padlock or the like, thus additionally assuring that the latch will remain in its locking position and rendering the hitch-coupler assembly theft proof.

The operation of the coupler of th present invention may be described as follows. The latch 27 is first pulled upwardly to its unlocking position through the use of the grasping ring 38. The shaft 22 and thrust block 25 are thereafter shifted to their ball-releasing position as shown in FIG. 4. The downwardly depending extension 29 of the latch 27, under the urging of springs 35 and 36, will bear against the peripheral surface of the thrust block 25, tending to maintain the shaft 22 and thrust block 25 in the position shown in FIGS. 1 and 4.

The coupler may then be placed over the hitch ball and lowered so that the hitch ball is received in the pocket 7. The shaft 22 may then be grasped by its handle portion 22a and pulled to the right (as viewed in FIG. 4) so that the thrust block achieves its ball-retaining position as shown in FIGS. 2 and 3. Under the influence of springs 35 and 36, the latch 27 will snap to its locking position as shown in FIG. 3. A shifting of the thrust block to the right in that Figure is precluded by the latch extension 28. A shifting of the thrust block to the left is precluded by the latch extension 29.

It will be evident from FIGS. 2 and 3 that the latch 27 is substantially foolproof. First of all, the latch plate is captively held in the assembly, and can not be removed therefrom without disassembly of the coupler. Gravity alone will tend to maintain the latch in its locking position. In addition to this, however, springs 35 and 36 are provided, either one of which wuld be sufficient to urge it to its latching position. Finally, even in the improbable circumstances where both springs 35 and 36 were broken or missing, the insertion of a padlock hasp, pin or other suitable means through the perforations 41 and 42 will positively maintain the latch in its locking position.

One other important feature of the latch 27 resides in the fact that if the thrust block 25 were to become loose upon the shaft 22 (through failure of its attaching means such as pin 26), the latch will still maintain the thrust block in its ball-retaining position, thus providing a high degree of reliability.

Despite the simple structure of the coupler of the preset invention, it is capable of withstanding all of the forces applied to it by the hitch ball. A forward thrust (in a direction of arrow A in FIG. 2) will be carried by the ball seat 10 in the rounded forward end 2 of the coupler body. Vertical compression loads (in the direction of arrow B in FIG. 2) will be partially carried by the ball seat 10 and primarily by the portion 12c of the reinforcing member 12 and the bolt 13 and its spacer sleeve 17. If the vertical compression load is sufficiently great to cause a deflection of the bolt 13 and its spacer sleeve 17, the reinforcing member 12 will tend to rock slightly, placing a part of the load onto the bolt 14. Vertical tension loads (in the direction of arrow D in FIG. 2) will be adsorbed by the ball seat 10 and the thrust block 25 and its shaft 22.

Longitudinal thrust forces (in the direction of arrow E in FIG. 2) will be divided between the bolt 13 and its spacer sleeve 17 and the thrust block 25 and its shaft 22. Finally, side or transverse forces (in the direction of arrows F and G in FIG. 1) are resisted by the forward portions of the reinforcing member legs 12a and 12b and the portions 3a and 4a of the body legs. As indicated above, the combination of the body legs and the downwardly depending legs 12a and 12b of the reinforcing member 12 provides a double-wall thickness for the coupler to sustain the transverse forces.

It will be understood by one skilled in the art that all of the above mentioned forces will be sustained by the body leg portions 3b and 4b where they are affixed to the frame members 5 and 6 of the vehicle being towed. Finally, it will be noted that the components of the coupler of the present invention are so configured that none of the forces to which the coupler is subjected can cause the thrust block 25 and shaft 22 to shift to their ball-releasing position, so that the ball is positively retained in the pocket 7 and cannot accidentally be released therefrom.

The coupler is so designed that it accommodates and dissipates the forces and stresses imposed thereon to a degree to lend optimal safety in use thereof. In spite of the substantial advantages so achieved, the coupler is highly economical to fabricate, apply and maintain in well functioning order.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect and the invention is therefore claimed in any of its forms or modifications within the legitimate and valid scope of the appended claims.

The embodiments of the invention in which an exclusive property or privilege is claimed are defined as follows:

1. A coupler for use with a ball-type hitch, said coupler having a body comprising a generally U-shaped, strap-like element defining a forward end and spaced legs extending rearwardly thereof, a rearwardly facing ball seat being located on the inside surface of said forward end, reinforcing means being affixed to said legs adjacent said forward end, said forward end and said reinforcing means forming a pocket for the receipt of a hitch ball, means to retain said hitch ball within said pocket, comprising a shaft extending transversely of said coupler body through coaxial holes in said body legs, said shaft being spaced rearwardly of said forward end, means defining a thrust surface for said hitch ball located on that portion of said shaft between said body legs, said thrust surface means providing at least one bearing surface thereon for said hitch ball, said shaft being movable axially in said holes, said shaft and thrust surface means being shiftable between a ball-retaining position wherein said thrust surface means is located midway between said body legs with said bearing surface thereon contactable by said hitch ball to preclude removal of said hitch ball from said pocket and a ball-releasing position wherein said thrust surface means is located adjacent one of said body legs with said bearing surface beyond said hitch ball to permit removal and insertion of said hitch ball in said pocket.

2. A coupler for use with a ball-type hitch, said coupler having a body compirising a generally U-shaped, strap-like element defining a forward end and spaced legs extending rearwardly thereof, a rearwardly facing ball seat being located on the inside surface of said forward end, reinforcing means being affixed to said legs adjacent said forward end, said forward end and said reinforcing means forming a pocket for the receipt of a hitch ball, means to retain said hitch ball within said pocket, said reinforcing means comprising a channel shaped member with a web portion and downwardly depending legs, said web portion lying in a plane substantially perpendicular to said body legs and said body's forward end, said reinforcing means being located between said body legs, means to affix each of said downwardly depending legs of said reinforcing means to the inside surface of the adjacent one of said body legs, the forwardmost portions of said downwardly depending legs comprising bearing surfaces for said hitch ball at the sides of said pocket, said web portion of said reinforcing means having a forward extension comprising a bearing surface for said hitch ball at the top of said pocket.

3. The structure claimed in claim 2 wherein said means to affix said reinforcing means legs to the adjacent ones of said body legs comprises a pair of bolts in parallel spaced relationship with their axes in a plane parallel to said web portion of said reinforcing means, each of said bolts extending transversely of said coupler body through coaxial perforations in said body legs and said reinforcing means legs, each of said bolts having a spacer sleeve extending from one to the other of said reinforcing means legs, said spacer sleeve on the one of said bolts lying nearest said body's forward end comprising an additional bearing surface for said hitch ball.

4. The structure claimed in claim 1 wherein said thrust surface means comprises a thrust block affixed to said shaft, said thrust block having a plurality of bearing surfaces about its periphery and wherein said shaft is rotatable in said holes in said body legs whereby rotation of said shaft will bring any one of said thrust block bearing surfaces into position to be contacted by said hitch ball when said thrust block is in said ball-retaining position.

5. The structure claimed in claim 1 including means to latch said means defining a thrust surface in said ball retaining position.

6. The structure claimed in claim 5 wherein said latch means comprises a plate-like structure located between said legs and lying in a plane perpendicular to said legs, said plate-like structure having a notch to receive therein at least a portion of said means defining a thrust surface when the same is in a ball retaining position to lock it in such position.

7. The structure claimed in claim 6 including means to bias said latch into said locking position.

8. A coupler for use with a ball type hitch comprising a body of strap form a surface portion of which is contoured to provide a bearing surface to seat a portion of the hitch, means bridging said body and fixed transverse thereto to provide an upper limit surface for a ball hitch applied to said bearing surface and means shiftable in a plane transversely of said body to contain a ball type hitch, a portion of which is applied to said bearing surface, or release the hitch therefrom.

9. A coupler device as in claim 8 wherein said body has portions directed in generally the same sense for attachment thereof to a load supporting structure to be towed and said bridging means includes a plate-like portion against which a portion of a ball type hitch may bear and said containing means is reciprocally mounted to bridge portions of said body which are directed in generally the same sense.

10. A coupler device as in claim 9 characterized by said body having a generally U shape and said bridging means is a reinforcing element including portions which are adapted to be contained against and in connected relation to oppositely disposed portions of said body.

11. A coupler device as set forth in claim 8 characterized by said body being of general U shape, having spaced leg portions joined by a base portion and oriented to have its leg portions project in a generally vertical sense, as applied to a device to be towed, said bearing surface being formed on the inner surface of said base portion of said generally U shaped body, said bridging means being a reinforcing plate structure interposed between said leg portions of said U shaped body and together with said shiftable means providing bearing surfaces for a ball shaped hitch element, and said shiftable means having a shaft-like form and, in association therewith, means for locking the same in a position to contain said ball shaped hitch element to said body.

12. A coupler device as in claim 11 characterized by said bridging means including dependent leg portions which are contained by said leg portions of said body, in a rearwardly spaced relation to said bearing surface, said dependent leg portions of said bridging means providing lateral bearing surfaces for a ball type hitch locked to said body.

13. A coupler device as in claim 12 characterized by the dependent leg portions of said bridging means being joined by a web means, a portion of which provides an additional bearing surface for a ball type hitch as it is contained in and locked to said body.

14. A coupler device as in claim 8 characterized by said shiftable means being a reciprocably mounted shaft bridging opposite leg portions of said body which has a generally U shaped configuration, said shaft mounting thereon a relatively enlarged portion to provide that the dimension between said enlarged portion and said bearing surface is less than the diameter of the applied ball type hitch whereby to facilitate the insertion and removal of a ball type hitch by reason of the transverse displacement of said enlarged portion of said shaft.

15. A coupler device as in claim 14 characterized by latch means locking said enlarged portion in a position wherein it contains a ball type hitch to said bearing surface, said latch means being formed to facilitate the displacement thereof and said enlarged portion of said shaft and automatically responding to a hitch containing position of said enlarged portion to latch the same in place.

16. A coupler for use with a ball-type hitch, including a body defining a generally U-shaped wall structure the bridging portion of which provides a forward end to the space defined thereby and the sides of which form separated legs extending rearwardly from said forward end in a transversely spaced relation said legs unitarily joining at their one ends to said forward end and freely projecting at their opposite ends, a rearwardly facing seat for a hitch ball being located on said forward end of said wall structure, reinforcing means connected to position between the separated legs of said wall structure within the space defined thereby intermediate the said one ends and said opposite ends of said legs and to have at least a portion thereof in a fixed relation thereto and located to overlie a hitch ball positioned on said rearwardly facing seat and to form a pocket with said forward end of said wall structure for receipt of said hitch ball, another portion of said reinforcing means positioning to be in backing relation to a ball seated in said pocket, the freely projecting opposite ends of said legs extending beyond said other portion of said reinforcing means and being formed to couple to a device to be towed, and means bridging the sides of said wall structure, said bridging means mounting means to retain said hitch ball within said pocket.

17. A coupler as set forth in claim 16 characterized in that said other portion of said reinforcing means provides a transversely extending fixed bearing surface for limiting the position of a hitch ball in said pocket and accommodating the thrust of the device to which the coupler is applied.

18. A coupler as in claim 16 characterized by said ball retaining means including at least one shaft-like unit in longitudinally spaced relation to said rearwardly facing seat and providing therewith means defining selectively useable limiting bearing surfaces for the hitch ball positioned in said pocket.

19. A coupler as set forth in claim 16, wherein said means to retain said hitch ball within said pocket presents a plurality of selectively applicable retaining surfaces.

* * * * *

UNITED STATES PATENT OFFICE
CERTIFICATE OF CORRECTION

Patent No. 3,794,356  Dated February 26, 1974

Inventor(s) Russell E. Hollis, Jr.

It is certified that error appears in the above-identified patent and that said Letters Patent are hereby corrected as shown below:

Col. 3, line 37, "planr" is corrected to read -- planar --.

Col. 5, line 22, "hat" is corrected to read -- that --.

Col. 5, line 44, "he" is corrected to read -- the --.

Col. 5, line 51, "th" is corrected to read -- the --.

Col. 6, line 11, "wuld" is corrected to read -- would --.

Col. 6, line 25, "preset" is corrected to read -- present --.

Signed and sealed this 10th day of September 1974.

(SEAL)
Attest:

McCOY M. GIBSON, JR.
Attesting Officer

C. MARSHALL DANN
Commissioner of Patents